Nov. 12, 1963  H. HENNE ETAL  3,110,561
PROCESS FOR THE PRODUCTION OF POTASSIUM SULFATE
Filed March 14, 1961
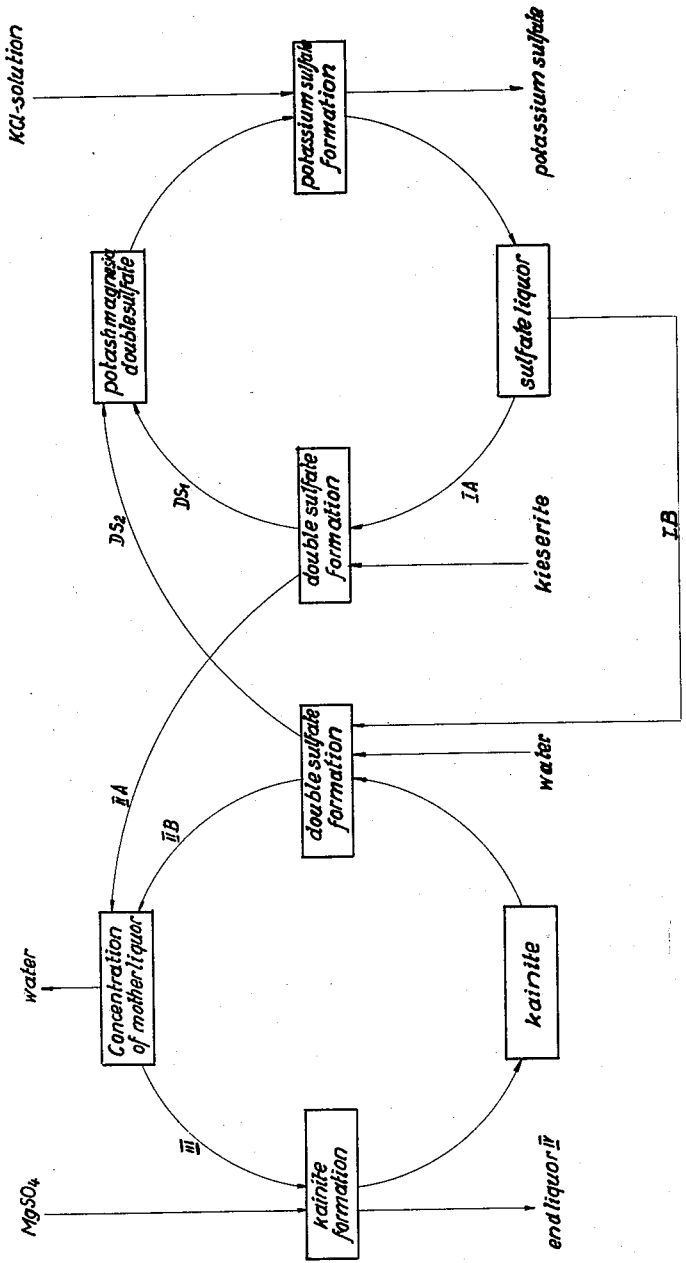
INVENTORS
HANS HENNE, KURT RATSCH and GERHARD BUDAN
BY
*Wenderoth, Lind & Ponack*
ATTORNEYS

United States Patent Office 3,110,561
Patented Nov. 12, 1963

3,110,561
PROCESS FOR THE PRODUCTION OF
POTASSIUM SULFATE
Hans Henne, Kassel-Wilhelmshohe, Kurt Ratsch, Wolfershausen (Werra), and Gerhard Budan, Kassel, Germany, assignors to Wintershall Aktiengesellschaft, Kassel, Germany
Filed Mar. 14, 1961, Ser. No. 95,657
Claims priority, application Germany Mar. 19, 1960
8 Claims. (Cl. 23—121)

This invention is concerned with an improved process for the production of potassium sulfate.

It is an object of the present invention to provide an improved process for the production of potassium sulfate, which is essentially self-contained in that the byproducts and liquors produced during the process can be recycled in the process with the exception of an exhausted waste liquor which can be discarded.

It is more particularly an object of the invention to provide a process for the production of potassium sulfate which avoids the formation of excessive amounts of mother liquors, the disposal of which requires additional recycling steps complicating the process.

Potassium sulfate is conventionally produced by reacting potassium chloride in aqueous solution with kieserite or epsomite (i.e. magnesium sulfate with one or with seven moles of water or crystallization), which leads to the formation, as an intermediary product, of a "double sulfate of potash-magnesia," also known as "kalimagnesia," which has the approximate composition $$K_2SO_4 \cdot MgSO_4 \cdot 6H_2O$$

Potassium sulfate is then obtained from the aforesaid double sulfate by reaction with potassium chloride, and the entire process can be formulated in a simplified manner as follows:

(a) $2KCl + 2MgSO_4 = K_2SO_4 \cdot MgSO_4 + MgCl_2$
(b) $K_2SO_4 \cdot MgSO_4 + 2KCl = 2K_2SO_4 + MgCl_2$
   Dissolved ("sulfate liquor")

disregarding the water of crystallization.

The above-stated objects are attained by the improved process of our invention which comprises (1) Mixing a major portion of the sulfate liquor with anhydrous magnesium sulfate, kieserite or mixtures thereof, whereby a reaction between the liquor and the added sulfate takes place under formation of potassium magnesium double sulfate and mother liquor, (2) Mixing the remaining portion of the sulfate liquor with kainite preferably with the addition of water whereby a reaction between these two substances takes place under formation of potassium magnesium double sulfate and mother liquor, (3) Separating the said potassium magnesium double sulfate from the said mother liquors of the two reactions, (4) Concentrating the combined mother liquors to reduce their volume, preferably by 30 to 40% of their total weight, (5) Mixing said concentrate with magnesium sulfate whereby a reaction between the latter and said concentrate takes place under formation of kainite in mixture with an end liquor, and (6) Separating said kainite from said end liquor.

(7) Recycling said kainite into the reaction with said remaining portion of sulfate liquor.

In the first phase of the process according to the invention, at least 20% up to about 40% and preferably about one-third of the initial sulfate liquor introduced into the phase of the known process illustrated by the Equation (a) hereinbefore, is subjected to the likewise known reaction with kainite, a potassium magnesium salt having essentially the composition $KCl \cdot MgSO_4 \cdot 3H_2O$, and water, which also leads to the formation of the above-mentioned double sulfate substantially according to the equation (c) $2(KCl \cdot MgSO_4 \cdot 3H_2O) + 3H_2O$
$\qquad = K_2SO_4 \cdot MgSO_4 \cdot 6H_2O + MgCl_2$ Artificial kainite, which can be used as starting material in this second phase of the proposed process, has heretofore been produced from the mother liquors resulting from the manufacture of potassium sulfate by the reaction of magnesium sulfate and carnallite $$(KCl \cdot MgCl_2 \cdot 6H_2O)$$

in which known process the kainite liquor from the reaction between the two aforesaid materials is evaporated with precipitation of carnallite, whereupon the latter is separated from its mother liquor and recycled for the preparation of further quantities of kainite.

However, in practice, this would lead to the drawback that there is obtained an excess of mother liquor from the final separation of potassium sulfate, which "sulfate liquor" cannot be recycled into the process for use in the above-mentioned reaction between the sulfate liquor and kieserite, according to Equation (a), but must be taken out of the continuous process and processed further separately.

We have now found that the above-described drawback such as the formation of excessive amounts of sulfate liquor, can be successfully avoided by the process of the present invention as outlined above, which process comprises, as an important feature, the possibility of producing the necessary amounts of kainite required for the above-described step (2) in the process itself, namely by the above-described steps (5) and (6).

The accompanying flowsheet illustrates the process according to our invention, and shows that potassium chloride in aqueous solution is reacted with the well known double sulfate, potash-magnesia, also known as "kalimagnesia," with stirring at about 30° to 60° C., and preferably at 45° to 50° C., for from about 5 to 60 minutes, and preferably about 20 to 30 minutes. Reaction times and temperatures in this and all following process steps depend, of course, on the exact composition of the materials and liquors involved, and vary according to that composition within the stated limits.

The resulting reaction mixture is separated by filtration, and there are obtained crystallized potasisum sulfate as the desired end product, and a mother liquor (I) referred to hereinafter as "sulfate liquor."

A major portion IA of this sulfate liquor I, namely about 60 to 80% by weight, and preferably about two-thirds of the sulfate liquor is reacted with kieserite, at a temperature of about 50° to 80° C., and preferably 60° to 70° C., for about 1 to 4 hours, and preferably 2 to 3 hours, under stirring, whereby there is obtained a slurry of double sulfate potash magnesia ($DS_1$), which is separated from its mother liquor IIA by filtration. The remaining minor portion IB of the sulfate liquor is reacted with kainite, if necessary with the addition of water, at a temperature of about 20° to 60° C., and preferably at 25° C., with stirring for about 5 to 30 minutes, and preferably for about 10 to 15 minutes.

In a preferred mode of carrying out the above-described conversion of the sulfate liquor to a slurry of double sulfate potash magnesia ($DS_1$) and mother liquor (IIA), anhydrous magnesium sulfate is used instead of kieserite. This has the advantage of yielding a mother liquor (IIA) of higher magnesium chloride content. Moreover we have found that the reaction is considerably accelerated so that the reaction time of about 1 to 4 hours stated above, is reduced to about 20 to 60 minutes, and in most cases to 30 to 40 minutes. Moreover, it is not necessary to heat externally during this reaction because the latter is exothermic.

By using mixtures of kieserite and anhydrous magnesium sulfate in different proportions, it is possible to control this reaction at will.

Anhydrous magnesium sulfate, which is preferred in this stage of our process, is advantageously obtained by the calcination of kieserite, and is also referred to as "calcined kieserite." Prior to its calcination, the kieserite must be purified, preferably by flotation with conventional floating agents, whereby a product of lower anhydrite content than in commercially available kieserite is obtained.

By the above described reaction of the minor portion IB of the sulfate liquor with kainite, there is produced a further amount of double sulfate $DS_2$, which is separated from its mother liquor IIB by filtration, and is combined with the first mentioned amount of $DS_1$. The mixture (DS) is then recycled into the reaction with further amounts of potassium chloride solution.

The following table lists by way of example, three typical compositions of "kalimagnesia" obtained from various runs of this phase of the process according to the invention:

| Component | (1) ($DS_1$) | (2) ($DS_2$) | (3) ($DS_2$) |
|---|---|---|---|
| | (in percent by weight) | | |
| $K_2SO_4$ | 38.3 | 29.2 | 35.6 |
| KCl | 1.0 | 19.8 | 3.6 |
| $MgCl_2$ | 4.8 | 2.8 | 2.8 |
| $MgSO_4$ | 28.9 | 21.2 | 31.0 |
| $H_2O$ | 27.0 | 27.0 | 27.0 |

Typical compositions of the resulting "kalimagnesia" mother liquors IIA and IIB are given in the table below:

| Component | (1) IIA | (2) IIB | (3) IIB |
|---|---|---|---|
| | (in grams per liter) | | |
| KCl | 94 | 98 | 55 |
| $MgCl_2$ | 185 | 193 | 213 |
| $MgSO_4$ | 86 | 77 | 127 |
| NaCl | 6 | 8 | 5 |
| $H_2O$ | 895 | 891 | 896 |

The two sets of values for $DS_2$ and IIB, respectively, given in the above two tables, correspond to different runs.

The "kalimagnesia" mother liquors (II) are combined and concentrated by heating the combined liquor, in a closed evaporator, at temperatures of about 120° to 160° C., and preferably 145° C., under about 1.5 to 3 atmospheres excess pressure, and preferably about 2.2 atmospheres excess pressure, to evaporate therefrom water in amounts of about 30 to 40% by weight based on the total weight of the combined liquors. The resulting concentrated, opaque "kalimagnesia" liquor III is reacted with magnesium sulfate, at temperatures of about 20 to 60° C., and depending on the composition and particularly the water content of the reactants, whereupon the resulting reaction mixture consisting of a slurry of kainite in an end liquor IV is separated by filtration, at the same temperature.

It is preferred to use anhydrous magnesium sulfate and to carry out the reaction and the filtration at about 30° C.

The resulting kainite is recycled into the above described reaction with the minor portion (IB), preferably one-third, of the sulfate liquor I, while the end liquor IV which is poor in potassium chloride, can be discarded.

It is recommended to carry out the concentration of the combined "kalimagnesia" liquors mainly at the boiling temperature of the latter, and to complete the concentration by further evaporation during the subsequent cooling of the resulting concentrate suspension which is best carried out in several stages. Thus, about two-thirds to three-quarters of the total water amount to be eliminated can be evaporated during the boiling step, and the remaining one-third to one-quarter during the subsequent cooling stages at temperatures of about 40 to 60° C., preferably at 50° C.

The process according to the present invention, which is applicable to the sulfate liquors occurring in all of the various methods of potassium sulfate production represents an important advance over the prior proposed methods for the production of potassium sulfate. Sulfate liquors to which the process of our invention is applicable have usually a content of 185 to 240 grams per liter of potassium chloride, 65 to 95 grams per liter of magnesium chloride, 45 to 80 grams of magnesium sulfate and 0 to 30 grams per liter of sodium chloride.

Potassium sulfate is produced from the double sulfate ($DS_1$ and $DS_2$) in a conventional manner, for instance as outlined above in accordance with Equation (*b*). It is thus possible to attain overall yields of potassium sulfate, based on the amount of initially introduced potassium in the form of potassium chloride, in the order of 93 to 98% and, on an average, of 95% and higher (as compared with about 74% attained in the known process).

In particular, it is an important progress over the known processes that the excess of sulfate liquor is worked up in the process itself, and all byproducts except the exhausted end liquor IV are recycled in the process itself. It is unnecessary to assign sulfate liquors for increasing the content of potassium in potassium chloride by dissolving sodium chloride or to provide installations for the recycling of carnallite in the plant. This permits a considerable reduction in size of the plant equipment involved. In addition, heat can be saved in that it is not necessary to heat any carnallite slurry.

The invention is further illustrated, but not limited, by the following examples:

EXAMPLE I

To 2833 cubic meters (cb. m.) of potassium chloride solution containing 336 grams of KCl and 4 grams of NaCl per liter thereof, there are added 1704 metric tons of potash magnesia double sulfate, the chemical analysis of which shows the composition (in percent by weight):

$K_2SO_4$ ---------------------------------------------- 34.5
KCl ------------------------------------------------- 8.0
$MgCl_2$ ---------------------------------------------- 3.6
$MgSO_4$ ---------------------------------------------- 26.9
$H_2O$ ----------------------------------------------- 27.0 and the resulting mixture is stirred in a reactor vessel for about 20 to 30 minutes with heating at a temperature of about 45° to 50° C.; the resulting slurry is separated, for instance, in a pressure filter, whereby there are obtained 1223 tons of potassium sulfate of the composition (in percent by weight):

$K_2SO_4$ ---------------------------------------------- 89.2
KCl ------------------------------------------------- 1.4
$MgCl_2$ ---------------------------------------------- 1.0
$MgSO_4$ ---------------------------------------------- 1.1
$H_2O$ ----------------------------------------------- 7.3 and 300 cb. m. of a sulfate liquor having the following composition (in grams per liter):

KCl ------------------------------------------------- 225
$MgCl_2$ ---------------------------------------------- 87
$MgSO_4$ ---------------------------------------------- 63
NaCl ------------------------------------------------ 5
$H_2O$ ----------------------------------------------- 859

To 2000 cb. m. of this sulfate liquor there are added 510 tons of kieserite, the analysis of which shows (in percent by weight):

| | |
|---|---|
| $MgSO_4$ | 80.0 |
| $CaSO_4$ | 5.0 |
| $NaCl$ | 3.0 |
| $H_2O$ | 12.0 | under stirring for about 150 minutes at a temperature of about 60° to 70° C., and the resulting slurry is filtered, and there are obtained about 767 tons of potash-magnesia double sulfate, analysis of which shows the following composition (in percent by weight):

| | |
|---|---|
| $K_2SO_4$ | 38.3 |
| $KCl$ | 1.0 |
| $MgCl_2$ | 4.8 |
| $MgSO_4$ | 28.9 |
| $H_2O$ | 27.0 | and a first quantity of potash-magnesia mother liquid. The remaining 1000 cb. m. of sulfate liquor are treated by adding thereto 1340 tons of kainite of the following composition (in percent by weight):

| | |
|---|---|
| $KCl$ | 23.6 |
| $MgCl_2$ | 5.4 |
| $MgSO_4$ | 43.5 |
| $H_2O$ | 27.5 | and 360 cb. m. of water, and stirring the resulting mixture at about 25° C. for about 10 to 15 minutes.

The resulting slurry is separated by filtration, and there are obtained about 937 tons of potash-magnesia double sulfate having the composition (in percent by weight):

| | |
|---|---|
| $K_2SO_4$ | 29.2 to 35.6 |
| $KCl$ | 19.8 to 3.6 |
| $MgCl_2$ | 2.8 |
| $MgSO_4$ | 21.2 to 31.0 |
| $H_2O$ | 27.0 | and a second quantity of "kalimagnesia" mother liquor.

The two batches of potash-magnesia double sulfate are combined and further processed with potassium chloride to obtain potassium sulfate, under the conditions described above.

The combined first and second quantities of potash-magnesia mother liquor amount to about 3190 cb. m. of "kalimagnesia" liquor, the balance being lost during the filtration and/or by evaporation and as water of crystallization.

The "kalimagnesia" liquor contains (in grams per liter):

| | |
|---|---|
| $KCl$ | 91 |
| $MgCl_2$ | 191 |
| $MgSO_4$ | 88 |
| $NaCl$ | 6 |
| $H_2O$ | 894 |

These combined mother liquors are now concentrated in a closed vessel by heating under normal pressure to boiling at about 145° C. under about 2.2 atmospheres excess pressure until about 1100 cb. m. of water have been evaporated. The liquor is then cooled, for example, first to 110° C., then to 75° C., and finally to about 50° C. whereby a further 340 cb. m. of water evaporates under the resulting reduced pressure in the closed vessel, the total amount eliminated during this concentration step being about 1440 cb. m. of water.

290 tons of anhydrous magnesium sulfate of the composition (in percent by weight):

| | Percent |
|---|---|
| $MgSO_4$ | 98.0 |
| $CaSO_4$ | 0.5 |
| $NaCl$ | 0.3 |
| $H_2O$ | 1.2 | are then added to the remaining 1750 cb. m. of concentrate and stirred at a temperature of about 30° C., whereby there are obtained, after filtration at the aforesaid temperature, about 1430 tons of kainite having the above-stated composition. The potassium content of this kainite expressed as $K_2O$ amounts to 14.9% by weight.

The end liquor obtained from the kainite filtration (in grams per liter):

| | |
|---|---|
| $KCl$ | 10 |
| $MgCl_2$ | 377 |
| $MgSO_4$ | 71 |
| $NaCl$ | 10 |
| $H_2O$ | 868 | which corresponds to a potassium content expressed as $K_2O$ of less than 0.76% by weight. This end liquor can therefore be discarded.

The kainite is recycled into the process by adding it to a new batch of 1000 cb. m. sulfate liquor.

*Example II*

Example I is repeated; however the 2000 cb. m. of sulfate liquor mentioned as the starting material for the treatment with 510 tons of kieserite are instead reacted with 450 tons of anhydrous magnesium sulfate, which has the composition in percent:

| | |
|---|---|
| $MgSO_4$ | 98 |
| $CaSO_4$ | 0.5 |
| $K_2SO_4$ | 0.5 |
| $NaCl$ | 0.2 |
| and $H_2O$ | 0.8 |

The resulting "kalimagnesia" liquor, having a density at 27° C. of 1.295 (g./cm.$^3$), contains in gram per liter:

| | |
|---|---|
| $KCl$ | 56 |
| $MgCl_2$ | 213 |
| $MgSO_4$ | 115 |
| $NaCl$ | 23 |
| and $H_2O$ | 888 |

In another run the following composition of the mother liquor is obtained:

| | |
|---|---|
| $KCl$ | 94 |
| $MgCl_2$ | 185 |
| $MgSO_2$ | 86 |
| $NaCl$ | 6 |
| and $H_2O$ | 895 |

The density of this liquor at 27° C. is about 1.305.

These mother liquor are further processed in the same manner and with essentially the same results as in Example I; however, considerably less energy is consumed for concentration of liquor IIA.

*Example III*

Example I is repeated, however, kieserite is replaced by a mixture of kieserite with anhydrous magnesium sulfate in a ratio of 1:1 (by weight). The results are similar to those obtained in Example II.

What is claimed is:

1. A continuous process for producing potassium sulfate which comprises (1) mixing, in an aqueous solution, potassium chloride and potassium magnesium double sulfate and separating the potassium sulfate and sulfate liquor resulting therefrom, (2) mixing a major portion of said sulfate liquor with magnesium sulfate having at most one mole of water of crystallization at a temperature of about 50° to 80° C. thereby forming potassium magnesium double sulfate and mother liquor, (3) mixing the remaining portion of said sulfate liquor with synthetic kainite at a temperature of about 20° to 60° C. thereby forming potassium magnesium double sulfate and mother liquor, (4) separating the potassium magnesium double sulfate from the mother liquors and recycling the potassium magnesium double sulfate into step (1), (5) evaporating a substantial portion of water from the said mother liquors by heating at 120° to 160° C. so as to obtain a concentrate thereof, (6) mixing said concentrate with magnesium sulfate at a temperature of about 20° to 60° C., whereby a reaction between the latter and said concentrate takes place with formation of kainite in mixture with an end liquor, (7) separating said kainite from said end liquor, and (8) recycling said kainite into step (3).

2. A continuous process for producing potassium sulfate which comprises (1) mixing, in an aqueous solution, potassium chloride and potassium magnesium double sulfate and separating the potassium sulfate and sulfate liquor resulting therefrom, (2) mixing a major portion of said sulfate liquor with kieserite at a temperature of about 50° to 80° C. thereby forming potassium magnesium double sulfate and mother liquor, (3) mixing the remaining portion of the sulfate liquor with synthetic kainite at a tetmperature of about 20° to 60° C. thereby forming potassium magnesium double sulfate and mother liquor, (4) separating the potassium magnesium double sulfate from the mother liquors and recycling the potassium double sulfate into step (1), (5) evaporating a substantial portion of water from the said mother liquors by heating at about 120° to 160° C. so as to obtain a concentrate thereof, (6) mixing said concentrate with magnesium sulfate at a temperature of about 20° to 60° C. thereby forming kainite in mixture with an end liquor, (7) separating said kainite from said end liquor, and (8) recycling said kainite into step (3).

3. A continuous process for producing potassium sulfate which comprises, (1) mixing, in an aqueous solution, potassium chloride and potassium magnesium double sulfate and separating the potassium sulfate and sulfate liquor resulting therefrom, (2) mixing a major portion of said sulfate liquor with kieserite at a temperature of about 60 to 70° C. thereby forming potassium magnesium double sulfate and mother liquor, (3) mixing the remaining portion of said sulfate liquor with synthetic kainite at a temperature of about 25° C. thereby forming potassium magnesium double sulfate and mother liquor, (4) separating the potassium magnesium double sulfate from the mother liquors and recycling the potassium double sulfate into step (1), (5) evaporating about 30 to 40% of the weight of the said mother liquors by heating to boiling so as to obtain a concentrate thereof, (6) mixing said concentrate with magnesium sulfate at a temperature of about 30° C. thereby forming kainite in mixture with an end liquor, (7) separating said kainite from said liquor, and (8) recycling said kainite into step (3).

4. A continuous process for producing potassium sulfate which comprises (1) mixing, in an aqueous solution, potassium chloride and potassium magnesium double sulfate and separating the potassium sulfate and sulfate liquor resulting therefrom, (2) mixing a major portion of said liquor with a magnesium sulfate having at most one mole of water of crystallization, while heating at about 50° to 80° C. thereby forming potassium magnesium double sulfate and mother liquor, (3) mixing the remaining portion of the sulfate liquor with synthetic kainite at a temperature of about 20° to 60° C. thereby forming potassium magnesium double sulfate and mother liquor, (4) separating the potassium magnesium double sulfate from the mother liquors and recycling the potassium magnesium double sulfate into step (1), (5) heating the said mother liquors at the boiling temperature of the latter until about 20 to 30% of the weight thereof have been evaporated therefrom, and subsequently cooling said mother liquors in stages to a temperature in the range of 40 to 60° C., simultaneously evaporating such further amounts of the said mother liquors that a total of from about 30 to 40% by weight of said mother liquors is evaporated and a concentrate thereof obtained, (6) mixing said concentrate with magnesium sulfate at a temperature of about 20° to 60° C. thereby forming kainite in mixture with an end liquor, (7) separating said kainite from said end liquor, and (8) recycling said kainite into step (3).

5. A continuous process for producing potassium sulfate which comprises (1) mixing, in an aqueous solution, potassium chloride and potassium magnesium double sulfate and separating the potassium sulfate and sulfate liquor resulting therefrom, (2) mixing a major portion of said sulfate liquor with anhydrous magnesium sulfate at a temperature of about 50° to 80° C. thereby forming a potassium magnesium double sulfate and mother liquor, (3) mixing the remaining portion of the sulfate liquor with synthetic kainite at a temperature of about 20° to 60° C. thereby forming potassium magnesium double sulfate and mother liquor, (4) separating potassium magnesium double sulfate from the mother liquors and recycling the potassium magnesium double sulfate into step (1), (5) evaporating a substantial portion of water from the said mother liquors by heating at about 120° to 160° C., so as to obtain a concentrate thereof, (6) mixing said concentrate with magnesium sulfate at a temperature of about 20° to 60° C. thereby forming kainite in mixture with an end liquor, (7) separating said kainite from said end liquor, and (8) recycling said kainite into step (3).

6. A continuous process for producing potassium sulfate which comprises (1) mixing, in an aqueous solution, potassium chloride and potassium magnesium double sulfate and separating the potassium sulfate and sulfate liquor resulting therefrom, (2) mixing a major portion of the sulfate liquor with a mixture of anhydrous magnesium sulfate and kieserite at a temperature of about 50° to 80° C. thereby forming potassium magnesium double sulfate and mother liquor, (3) mixing the remaining portion of the sulfate liquor with artificial kainite at a temperature of about 20° to 60° C. whereby a reaction between these two substances takes place with formation of potassium magnesium double sulfate and mother liquor, (4) separating the potassium magnesium double sulfate from the mother liquors and recycling the potassium magnesium double sulfate in step (1), (5) evaporating a substantial portion of water from the said mother liquors by heating at a temperature of about 120° to 160° C., so as to obtain a concentrate thereof, (6) mixing said concentrate with magnesium sulfate thereby forming kainite in mixture with an end liquor, (7) separating said kainite from said end liquor, and (8) recycling the kainite into step (3).

7. A continuous process for producing potassium sulfate which comprises (1) mixing, in an aqueous solution, potassium chloride and potassium magnesium double sulfate and separating the potassium sulfate and sulfate liquor resulting therefrom, (2) mixing a major portion of said sulfate liquor with anhydrous magnesium sulfate at a temperature of about 60° to 70° C. thereby forming potassium magnesium double sulfate and mother liquor, (3) mixing the remaining portion of the sulfate liquor with synthetic kainite and water at a temperature of about 25° C., thereby forming potassium magnesium double sulfate and mother liquor, (4) separating the potassium magnesium double sulfate from the mother liquors and recycling the potassium magnesium double sulfate into step (1), (5) evaporating about 30 to 40% of the weight of the said mother liquors by heating to boiling so as to obtain a concentrate thereof, (6) mixing said concentrate with magnesium sulfate at a temperature of about 30° C. thereby forming kainite in mixture with an end liquor, (7) separating said kainite from said end liquor, and (8) recycling the kainite into step (3).

8. A continuous process for producing potassium sulfate which comprises (1) mixing, in an aqueous solution, potassium chloride and potassium magnesium double sulfate and separating the potassium sulfate and sulfate liquor resulting therefrom, (2) mixing a major portion of said sulfate liquor with a mixture of anhydrous magnesium sulfate and kieserite at a temperature of about 60 to 70° C. thereby forming potassium magnesium double sulfate and mother liquor, (3) mixing the remaining portion of the sulfate liquor with artificial kainite at a temperature of about 25° C. thereby forming potassium magnesium double sulfate and mother liquor, (4) separating the potassium magnesium double sulfate from the mother liquors and recycling the potassium magnesium double sulfate into step (1), (5) evaporating about 30 to 40% of the weight of said mother liquors by heating to boiling so as to obtain a concentrate thereof, (6) mixing said concentrate with magnesium sulfate at a temperature of about 30° C. thereby forming kainite in mixture with an end liquor, (7) separating said kainite from said end liquor, and (8) recycling the kainite into step (3).

References Cited in the file of this patent
UNITED STATES PATENTS

| | | |
|---|---|---|
| 2,437,182 | Barr et al. | Mar. 2, 1948 |
| 2,862,788 | Stanley et al. | Dec. 2, 1958 |
| 2,902,344 | Cevidalli et al. | Sept. 1, 1959 |
| 3,058,806 | Ebner | Oct. 16, 1962 |